July 11, 1933.  W. H. McGRATH  1,917,895
METHOD AND APPARATUS FOR CONDENSING AND PURIFYING VAPORS AND GASES
Filed Dec. 4, 1929
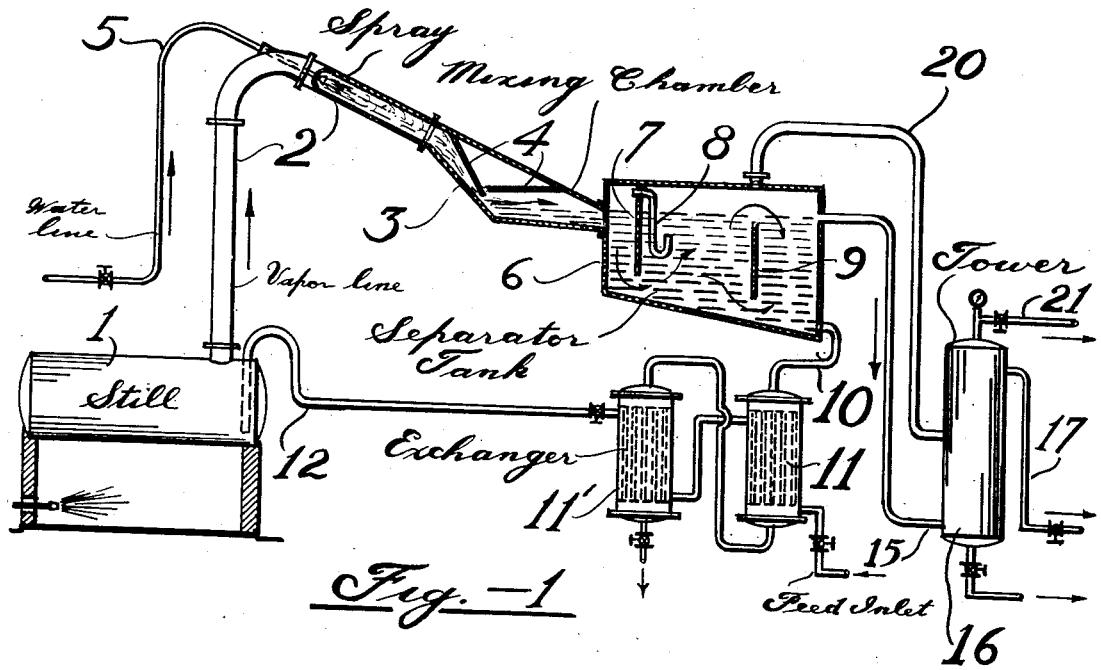
Fig.-1
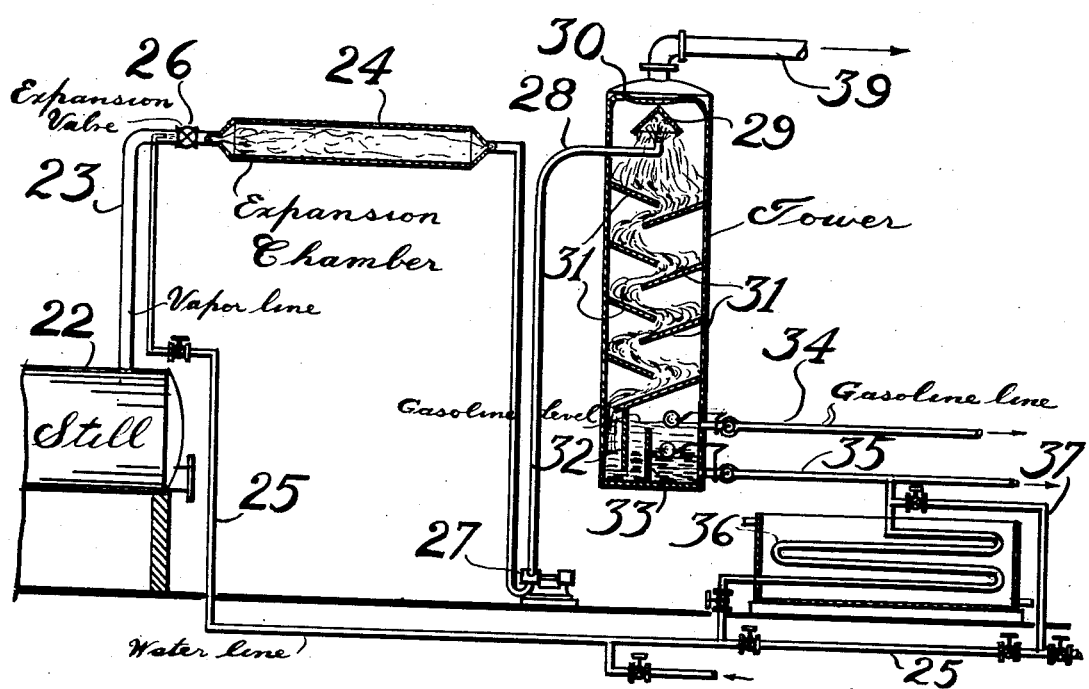
Fig.-2
Fig.-3
INVENTOR
William H. McGrath
BY
ATTORNEY

UNITED STATES PATENT OFFICE

WILLIAM HENRY McGRATH, OF ROSELLE PARK, NEW JERSEY, ASSIGNOR TO STANDARD OIL DEVELOPMENT COMPANY, A CORPORATION OF DELAWARE

METHOD AND APPARATUS FOR CONDENSING AND PURIFYING VAPORS AND GASES

Application filed December 4, 1929. Serial No. 411,450.

This invention relates to the condensation and purification of oil and more particularly to the washing of oil in vapor form to remove hydrogen sulfide or other impurities. Reference is made particularly to the treatment of hydrocarbon oil vapors, such as gasoline vapors, but the invention is not limited thereto. The invention will be fully understood from the following discussion accompanied by the attached drawing, in which Fig. 1 is a schematic side elevation of a preferred form of apparatus;

Fig. 2 is an elevation of a modified form of the apparatus; and

Fig. 3 is an enlarged detailed side elevation of an expansion chamber and related parts.

Referring more particularly to the form of construction of Fig. 1 of the drawing, reference character 1 designates a still from which gasoline vapors are evolved. A vapor line 2 connects the still to a mixing chamber 3 having baffle plates 4. A line 5 injects a spray of cool wash liquid, such as water, into the vapor line 2, and effects intimate mixing of the wash liquid with the vapors, thereby condensing the latter. The mixed condensate and wash liquid flow into a separator tank 6. A baffle plate 7 projects downwardly from the roof of the inlet end of the tank 6 and terminates in spaced relation to the bottom of the tank. A pipe 8 communicates with the vapor space on the inlet side of the baffle plate 7 and opens below the normal level of liquid on the opposite side of the plate. A baffle plate 9 adjacent the discharge end of the tank extends across the tank below the normal level of liquid and in spaced relation to the bottom of the tank. Incondensible gas passing through pipe 8 is washed by the liquid in the tank. It will be seen that all the gas passes through the liquid. The wash water accumulates upon the bottom of the tank and is drawn off through line 10 and heat exchangers 11 and 11'. Feed oil passes through the heat exchangers and through line 12 to the still. The gasoline is drawn from tank 6 through line 15 to tower 16 and is discharged through outlet pipe 17. Gas is withdrawn from tank 6 through line 20, is washed in tower 16 and is discharged through line 21.

Referring more particularly to the form of construction illustrated in Figs. 2 and 3, the vapors generated in still 22 pass through vapor line 23 to an expansion chamber 24. Wash water is injected into the vapor line 23 from a line 25 cooling the vapors prior to their passage through an expansion valve 26, shown in more detail in Fig. 3. The vapors are thus intimately intermixed with the wash water and are condensed. The mixed condensate and water are forced by pump 27 through line 28 against a deflector plate 29 in tower 30. The mixed liquids flow downwardly through the tower over splash plates 31 and settle in the bottom of the tower in layers.

The settling action is facilitated by the baffle plates 32 and 33. A float valve controlled line 34 conducts the gasoline from the tower. The wash water is discharged through a float valve controlled line 35 to a cooler 36 and ultimately to the line 25. If desired the water can be by-passed around the cooler through a line 37. Gas is conducted from the tower through line 39.

While the invention has been described as particularly applicable to the washing of gasoline with water it will be understood that it is applicable to the washing of other vapors, such as fractions of hydrocarbon distillates (naphtha, kerosene, or the like). Oils, alcohols, etc., may be used instead of water depending upon the nature of the vapors treated and the impurities to be removed. Where stratification is impractical, distillation or other suitable means may be used.

Although the present invention has been described in connection with the specific details of an embodiment thereof, it is not intended that these details should be regarded as limitations upon the scope of the invention, except insofar as required in the accompanying claims.

I claim:

1. A washing device comprising a conduit for vapors, means for injecting wash liquid into the vapors in the conduit, means for mixing the wash liquid and resulting condensate, a receptacle to receive the mixed wash liquid and condensate, and means in the receptacle for causing any incondensible gas associated with the vapors to pass through the mixture.

2. Method of washing vapors, comprising showering the same with a washing liquid of relatively low temperature, passing the washing liquid, condensate formed from the vapors, and any incondensible gas into a mixing zone wherein they are brought into intimate contact, passing the washing liquid and condensate into a separation zone, collecting any incondensible gas in the upper part thereof and discharging it through the liquid therein, and separately withdrawing the separated liquids.

3. A washing device comprising a conduit for vapors and gases, means for spraying wash liquid into the vapors in the conduit whereby the vapors are washed and condensed, means for mixing the condensate, all the gas and wash liquid, said last mentioned means comprising a chamber having a baffle plate against which the wash liquid, gas and condensate are discharged followed by a tank in which the flow of liquid is interrupted by further baffle plates, and means for separating the wash liquid, condensate and any incondensible gas.

WILLIAM HENRY McGRATH.